UNITED STATES PATENT OFFICE.

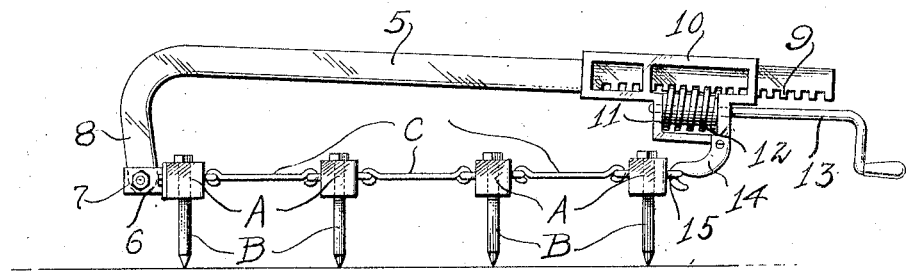
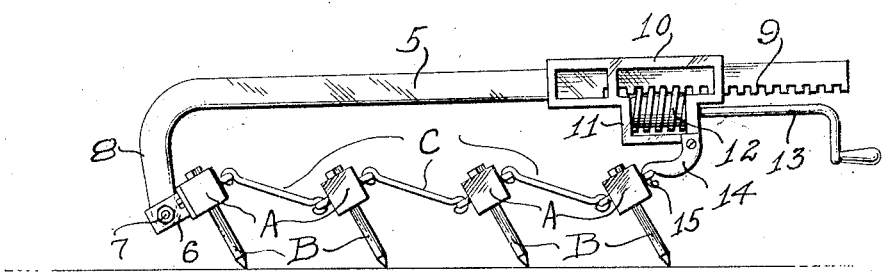
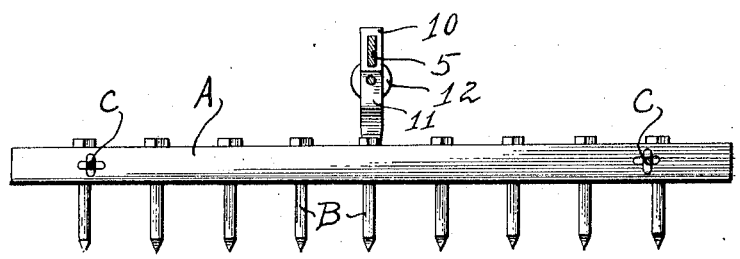

DAVID N. TAYLOR, OF LEWISBURG, TENNESSEE.

HARROW.

1,332,148.  Specification of Letters Patent.  Patented Feb. 24, 1920.

Application filed May 10, 1919. Serial No. 296,092.

*To all whom it may concern:*

Be it known that I, DAVID N. TAYLOR, a citizen of the United States, residing at Lewisburg, in the county of Marshall and State of Tennessee, have invented certain new and useful Improvements in Harrows, of which the following is a specification.

My invention relates in general to harrows commonly used in preparing soil for agricultural purposes, and particularly to an improved means for regulating the pitch or angle of the harrow teeth, which is desirable for different kinds of soil.

As heretofore practised, various means have been devised for obtaining different adjustments of the harrow teeth, but these means are open to a great many objections, which are overcome by the present invention. As an example, most of the devices so far employed require considerable effort and an undue amount of time in changing from one adjustment of the teeth to another; one feature of the present invention resides in so constructing the regulating device that the different adjustments may be had by manipulating a handle which is presented in a convenient manner for this purpose; furthermore, to provide a device which may be readily applied and used to rigidly retain the flexibly connected sections of the harrow in spaced relation.

Further features will be more particularly pointed out in the following detailed description and with reference to the accompanying drawing.

In said drawing:—

Figure 1 is a side view of a drag harrow, illustrating the invention as retaining the sections in rigid spaced relation with the teeth vertical;

Fig. 2 is a side view of a harrow with the invention applied, and illustrating the teeth as adjusted at an angle; and Fig. 3 is an end view of one of the harrow sections.

Referring to the drawing in detail, the invention will be described as best applicable to a drag harrow, constructed of a number of frame sections A, having the usual teeth B for penetrating the soil, the sections being connected in spaced relation by the flexible connecting links C. It matters not from which end the harrow is dragged, but for convenience the dragging means will be connected to the section at the left of the illustration. The sections being connected by flexible means, such as the links C, enable the teeth to be readily adjusted to any desired pitch, which may be accomplished by the rack 5, connected to the front frame section through the bifurcated plate 6 supporting the pintle 7, which is received in an opening in the end of the downwardly presented portion 8 of the rack. The rack extends rearwardly and parallel to the harrow, with its end provided with a series of teeth 9 on the under side thereof. Slidably mounted on the rack is frame 10, having an offset portion constituting a support 11 for the screw 12, which is provided with an axle having a bearing in the support, a suitable handle 13 being provided to rotate the gear and, as the gear is supported in mesh with the teeth 9 of the rack, cause the rack to slide in the frame in a direction according to the rotation of the gear. On the gear support 11 is the connecting means for the rear frame section of the harrow. This connection may be had in any practical manner, such as the hook 14 engaging an eye 15 on the frame. It will be noticed that, as one end of the rack is connected to the harrow frame, and as the frame 10, which carries the screw, is connected to the other end of the harrow frame, rotation of the gear will cause the rack to shorten or lengthen the distance between these two connections and thus change the angle of the harrow teeth relative to the surface of the ground which they are to traverse. By shortening the distance between the connections, the teeth will assume an adjustment as shown in Fig. 2, and by lengthening the distance, the teeth will assume a position as in Fig. 1. When the distance between the connections has been increased to its maximum, the sections of the harrow frame will be held rigidly in spaced relation with the teeth presented vertically.

Claims:—

1. A drag harrow, constructed of a plurality of frame sections, with flexible means connecting the sections, a toothed rack connecting the front section with the rear section, a screw associated with said rack adapted to engage the teeth thereof, and an operating handle on said screw adapted to manipulate the rack and rigidly connect all of the frame sections.

2. A device for regulating the pitch of harrow teeth, comprising a toothed rack having means for connecting it to the harrow frame, a slidably mounted screw support on said rack having means for connecting it to the harrow frame, a screw on said support engaging the teeth of the rack, and a handle connected to said screw adapted to rotate same to shorten or increase the distance between the harrow frame connecting means on the rack and the harrow frame connecting means on the screw support.

DAVID N. TAYLOR.